United States Patent
Orrell

(10) Patent No.: US 10,775,347 B2
(45) Date of Patent: Sep. 15, 2020

(54) MATERIAL INSPECTION USING EDDY CURRENTS

(71) Applicant: The Technology Partnership PLC, Cambridge (GB)

(72) Inventor: Martin Orrell, Cambridge (GB)

(73) Assignee: THE TECHNOLOGY PARTNERSHIP PLC, Cambridge (GB)

(*) Notice: Subject to any disclaimer, the term of this patent is extended or adjusted under 35 U.S.C. 154(b) by 120 days.

(21) Appl. No.: 15/752,485

(22) PCT Filed: Aug. 9, 2016

(86) PCT No.: PCT/EP2016/068938
§ 371 (c)(1),
(2) Date: Feb. 13, 2018

(87) PCT Pub. No.: WO2017/029154
PCT Pub. Date: Feb. 23, 2017

(65) Prior Publication Data
US 2018/0238832 A1  Aug. 23, 2018

(30) Foreign Application Priority Data

Aug. 14, 2015 (GB) .................................. 1514470.2

(51) Int. Cl.
*G01N 27/90* (2006.01)
*G01N 27/02* (2006.01)

(52) U.S. Cl.
CPC ....... *G01N 27/9046* (2013.01); *G01N 27/025* (2013.01); *G01N 27/902* (2013.01); *G01N 27/9033* (2013.01)

(58) Field of Classification Search
None
See application file for complete search history.

(56) References Cited

U.S. PATENT DOCUMENTS

| | | | |
|---|---|---|---|
| 5,461,921 A | 10/1995 | Papadakis et al. | |
| 7,973,532 B2 | 7/2011 | Forgang et al. | |
| 2007/0122920 A1* | 5/2007 | Bornstein | H01L 21/28035 438/5 |
| 2008/0068008 A1 | 3/2008 | Watson et al. | |
| 2009/0071078 A1* | 3/2009 | Rakow | F16B 33/06 52/1 |
| 2010/0288049 A1 | 11/2010 | Hoyt | |

OTHER PUBLICATIONS

Notification of Transmittal of the International Search Report and the Written Opinion of the International Search Authority, or the Declaration issued in corresponding application No. PCT/EP2016/068938 dated Oct. 12, 2016, 12 pages.

* cited by examiner

*Primary Examiner* — Paresh Patel
(74) *Attorney, Agent, or Firm* — Carter, Deluca & Farrell LLP

(57) ABSTRACT

A method of inspecting a material comprising: producing at least one eddy current excitation in a material under test; sensing said at least one eddy current excitation in the material under test; wherein the method comprises using a low cross-correlation coded spread spectrum to produce said at least one eddy current excitation, and using a correlation technique to make a determination of amplitude and phase of the sensed eddy current excitation; wherein the method further comprises using the determination to make an assessment of the material under test.

20 Claims, 10 Drawing Sheets

MATERIAL INSPECTION USING EDDY CURRENTS

The present application relates to a method, apparatus and computer program for inspecting a material, and more particularly to a method, apparatus and computer program for inspecting a material utilising eddy currents.

BACKGROUND

Eddy current inspection is one of several non-destructive testing (NDT) methods that use the principle of "electromagnetism" as the basis for conducting examinations. Several other methods such as Remote Field Testing (RFT), Flux Leakage and Barkhausen Noise also use this principle. One of the features of NDT is that it enables a material to be examined without causing damage thereof.

Eddy currents are created through a process called electromagnetic induction. When alternating current is applied to the conductor, such as copper wire, a magnetic field develops in and around the conductor. This magnetic field expands as the alternating current rises to maximum and collapses as the current is reduced to zero. If another electrical conductor is brought into the close proximity to this changing magnetic field, current will be induced in this second conductor. Eddy currents are induced electrical currents that flow in a circular path.

Eddy currents are affected by the electrical conductivity and magnetic permeability of materials. Therefore, eddy current measurements can be used to sort materials and to tell if a material has seen high temperatures or been heat treated, which changes the conductivity of some materials.

Eddy current testing has been used as the primary non-destructive evaluation technique in a number of industries for more than fifty years. Though the technique is powerful in principle, the inspection process is often time consuming since the impedance plane signal returned by the probe is difficult to interpret and often requires special operator training.

Research is currently being conducted on the use of a technique called pulsed eddy current (PEC) testing. This technique can be used for the detection and quantification of corrosion and cracking in multi-layer aluminium aircraft structures. Pulsed eddy-current signals consist of a spectrum of frequencies meaning that, because of the skin effect, each received pulse signal contains information from a range of depths within a given test specimen. In addition, the pulse signals are very low-frequency rich which provides excellent depth penetration.

Most eddy current systems use single or multiple coils. The coils are normally excited either singly or in multiples where distance allows. The coils are normally excited with sinusoidal signals and are arranged in a bridge configuration. The detector measures amplitude and phase. The coils can be single or a differential pair. There are many examples of prior art where the sensor design is created as a mechanical arrangement.

US 2008/0068008 suggests the use of spread spectrum in the context of creating a magnetic sensor for crash detection in automobiles. The sensor generates an eddy current at either a single sinusoidal frequency or multiple frequencies by for example spread spectrum or frequency hopping techniques, the purpose being to detect a change in the generated eddy current as a result of an impact.

SUMMARY OF INVENTION

In a first aspect there is provided a method of inspecting a material comprising: producing at least one eddy current excitation in a material under test; sensing said at least one eddy current excitation in the material under test; wherein the method comprises using a low cross-correlation coded spread spectrum to produce said at least one eddy current excitation, and using a correlation technique to make a determination of amplitude and phase of the sensed eddy current excitation; wherein the method further comprises using the determination to make an assessment of the material under test.

Preferably multiple eddy current excitations are produced and sensed; each excitation being distinguished due to respective unique codes of the excitations.

Preferably the method comprises using an array of sensors for said sensing said at least one eddy current excitation.

Preferably the determination is used to determine the presence of one or more defects in the material under test.

Preferably the determination is used to determine a material type of the material under test.

Preferably the determination is used to determine if the material has undergone local burning or heat treatment.

Preferably a detected defect can be longer than one probe diameter of a probe used for said sensing.

Preferably the method comprises detecting and compensating for at least one of: lift off; temperature variation.

Preferably the method comprises detecting gradual changes in properties of the material under test.

Preferably the method comprises maintaining said array of sensors in a static position relative to said material under test during said sensing.

Preferably the method comprises altering parameters of the low cross correlation spread spectrum based on the determination.

Preferably the method comprises using the sensed at least one eddy current excitation to make an assessment of a structural integrity of the material under test.

Preferably the method comprises using the sensed at least one eddy current excitation to produce a volumetric visualisation of the material under test.

Preferably the method comprises using the determination to provide feedback to a manufacturing process producing the material under test.

In a second aspect there is provided a computer program comprising computer executable instructions which when run on one or more processors performs the method of the first aspect.

In a third aspect there is provided an apparatus comprising: means for producing at least one eddy current excitation in a material under test; means for sensing said at least one eddy current excitation in the material under test; wherein the means for producing said at least one eddy current excitation is configured to use a low cross correlation coded spread spectrum to produce said at least one eddy current excitation; wherein the apparatus comprises determining means for making a determination of amplitude and phase of the sensed at least one eddy current excitation using a correlation technique; and wherein the apparatus further comprises assessing means for using the determination to make an assessment of the material under test.

Preferably the means for producing at least one eddy current excitation is configured to produce multiple eddy current excitations, and the means for sensing said at least one eddy current excitation is configured to sense multiple eddy current excitations, and wherein the apparatus is configured to distinguish each excitation due to respective unique codes of the excitations.

Preferably said sensing means comprises an array of sensors.

Preferably the assessing means is configured to use the determination to determine the presence of one or more defects in the material under test.

Preferably the assessing means is configured to use the determination to determine a material type of the material under test.

Preferably the assessing means is configured to use the determination to determine if the material under test has undergone local burning or heat treatment.

Preferably the means for sensing comprises a probe, and wherein a detected defect can be longer than a diameter of the probe.

Preferably the apparatus comprises means for detecting and compensating for at least one of: lift off; temperature variation.

Preferably the apparatus comprises means for detecting gradual changes in properties of the material under test.

Preferably said array of sensors are configured to be held in a static position relative to said material under test during sensing of said at least one eddy current excitation.

Preferably the apparatus comprises means for altering parameters of the low cross-correlation spread spectrum based on the determination.

Preferably the assessing means is configured to use the sensed at least one eddy current excitation to make an assessment of a structural integrity of the material under test.

Preferably the apparatus comprises means for using the sensed at least one eddy current excitation to produce a volumetric visualisation of the material.

Preferably the apparatus comprises means for using the determination to provide feedback to a manufacturing process producing the material under test.

Accordingly embodiments may generally relate to inspection systems and more specifically to a method and system for creating and receiving signals that can operate in the presence of each other and external noise over a wide frequency range without adjustment.

Embodiments may provide a method, computer program and apparatus for creating a signal that enables accurate direct amplitude and phase measurement by optimising the signal to noise ratio. Embodiments use coded spread spectrum and correlation to derive an equivalent amplitude and phase thus providing an improvement in signal noise through coding gain. Additionally the coding enables multiple signals to be delivered simultaneously without each causing interference to the other.

BRIEF DESCRIPTION OF THE FIGURES

Some embodiments will now be described, by way of example only, with respect to the accompanying drawings in which:

As discussed briefly above, non-destructive testing can be used to detect properties of or defects in materials. FIG. 1 shows a plot of inductive reactance, X against resistance, R. This is a typical output that may be obtained using an eddy current probe. As shown in the plot the properties of inductive reactance and resistance differ between materials. The difference may be particularly marked between magnetic and non-magnetic materials. As shown in FIG. 1 steel has a relatively high inductive reactance and a relatively low resistance, whereas aluminium has a relatively low inductive reactance and a relatively high resistance. Knowing these typical properties of a material, sensors can be used to determine when values of those properties differ from the typically known values during testing of the material. For example if the inductive reactance and/or resistance of a piece of aluminium material under testing differs from the accepted values for aluminium, then this could be indicative of a defect in the material such as a crack. A user or machine can be alerted to such a defect.

Figure 1:
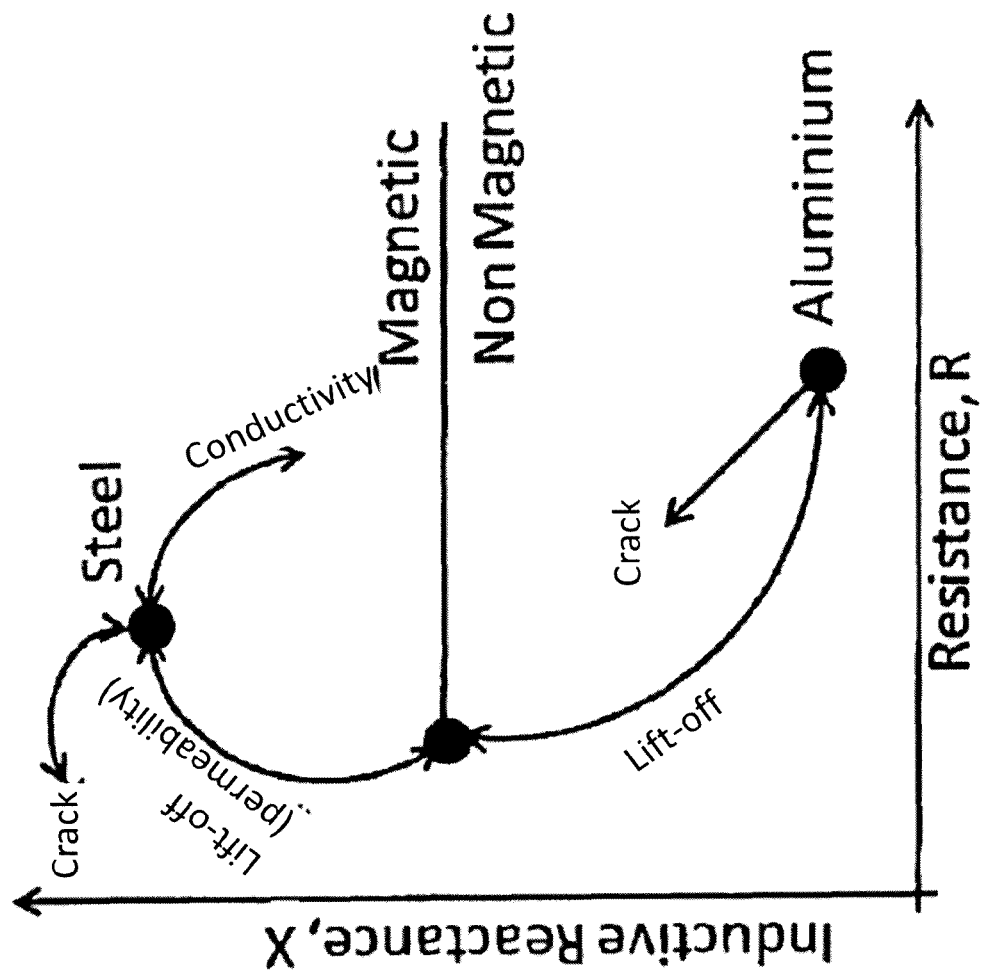
FIG. 1 shows a plot of inductive reactance against resistance for certain materials.
Figure 2:
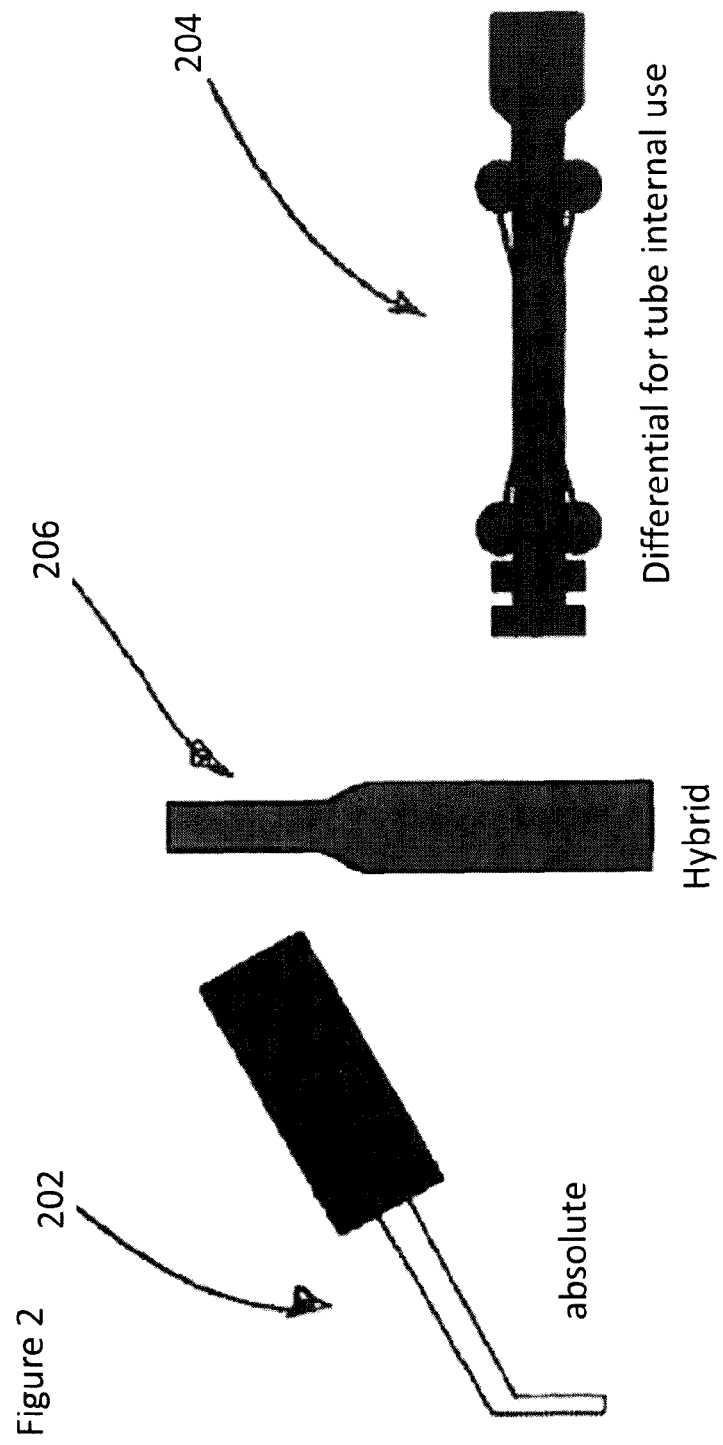
FIG. 2 shows examples of certain electromagnetic probes.

Some examples of known probes that may be used to obtain such plots are shown in FIG. 2 and discussed in more detail below.

An "absolute probe" is shown generally at 202, comprising a single test coil that is used to generate the eddy currents and sense changes in the eddy current field. An AC signal is passed through the coil and this sets-up an expanding and collapsing magnetic field in and around the coil. When the probe is positioned next to a conductive material, the changing magnetic field generates eddy currents within the material. The generation of the eddy currents uses energy from the coil and this appears as an increase in the electrical resistance of the coil. The eddy currents generate their own magnetic field that opposes the magnetic field of the coil and this changes the inductive reactance of the coil. By measuring the absolute change in impedance of the test coil, information can be gained about the test material. Absolute coils can be used for flaw detection, conductivity measurements, liftoff measurements and thickness measurements. They are widely used due to their versatility. Since absolute probes are sensitive to variables such as conductivity, permeability liftoff and temperature, steps may be taken to minimize these variables when they are not important to the inspection being performed. It is therefore common for commercially available absolute probes to have a fixed "air loaded" reference coil that compensates for ambient temperature variations.

A "differential probe" is shown generally at 204. The differential probe has two active coils usually wound in opposition, although they could be wound in addition with similar results. When the two coils are over a flaw-free area of a test sample, there is no differential signal developed between the coils since they are both inspecting identical material. However, when one coil is over a defect and the other is over good material, a differential signal is produced. Differential probes have an advantage of being very sensitive to a defect yet relatively insensitive to slowly varying properties such as gradual dimensional or temperature variations. Probe wobble signals are also reduced with this probe type. There are also disadvantages to using differential probes. Most notably, the signals may be difficult to interpret. For example, if a flaw is longer than the spacing between the two coils, only the leading and trailing edges will be detected due to signal cancellation when both coils sense the flaw equally.

Reflection probes (not shown) have two coils similar to a differential probe, but one coil is used to excite the eddy currents and the other is used to sense changes in the test material. Probes of this arrangement are often referred to as driver/pickup probes. An advantage of reflection probes is that the driver coil can be made so as to produce a strong and uniform flux field in the vicinity of the pickup coil. The pickup coil can be made very small so that it will be sensitive to very small defects.

Figure 3:
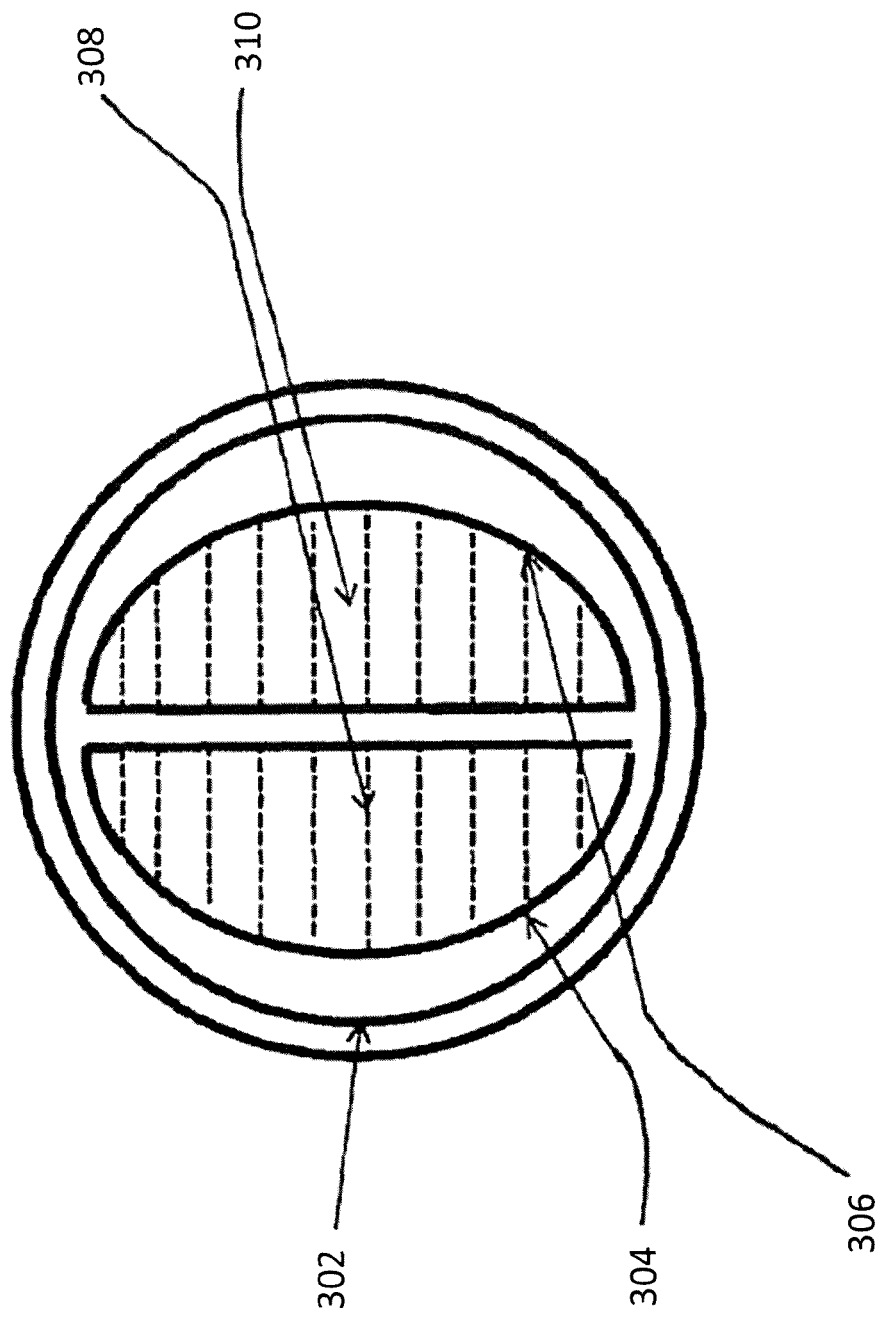
FIG. 3 is a drawing in cross-section showing certain elements of a split-D, differential probe.

A hybrid probe is shown generally at 206. An example of a hybrid probe is a split D, differential probe shown in more detail in FIG. 3. This probe has a driver coil 302 that surrounds two D shaped sensing coils 304 and 306. The probe also comprises coil formers 308 and 310. It operates in the reflection mode but additionally its sensing coils operate in the differential mode. This type of probe may be very sensitive to surface cracks. Another example of a hybrid probe is one that uses a conventional coil to generate eddy currents in the material but then uses a different type of sensor to detect changes on the surface and within the test material. An example of a hybrid probe is one that uses a Hall effect sensor to detect changes in the magnetic flux leaking from the test surface. Hybrid probes are usually specially designed for a specific inspection application.

"Probe shielding" may be used to prevent or reduce the interaction of the probe's magnetic field with non relevant features in close proximity to the probe. Shielding could be used to reduce edge effects when testing near dimensional transitions such as a step or an edge. Shielding could also be used to reduce the effects of conductive or magnetic fasteners in the region of testing.

Eddy current probes are most often shielded using magnetic shielding or eddy current shielding. Magnetically shielded probes have their coil surrounded by a ring of ferrite or other material with high permeability and low conductivity. The ferrite creates an area of low magnetic reluctance and the probe's magnetic field is concentrated in this area rather than spreading beyond the shielding. This concentrates the magnetic field into a tighter area around the coil. Eddy current shielding uses a ring of highly conductive but non-magnetic material, usually copper, to surround the coil. The portion of the coil's magnetic field that cuts across the shielding generates eddy currents in the shielding material rather than in the non-relevant features outside of the shielded area. The higher the frequency of the current used to drive the probe, the more effective the shielding will be due to skin effect in the shielding material.

A feature in eddy current testing is the way in which the eddy currents are induced and detected in the material under test. This depends on the design of the probe, which can contain either one or more coils. A coil consists of a length of wire wound in a helical manner around the length of a cylindrical tube or rod, called a former. The winding usually has more than one layer so as to increase the value of inductance for a given length of coil. It is desirable with eddy current testing that the wire is made from copper or other non-ferrous metal to avoid magnetic hysteresis effects. The main purpose of the former is to provide a sufficient amount of rigidity in the coil to prevent distortion. Formers used for coils with diameters greater than a few millimetres, e.g. encircling and pancake coils, generally take the form of tubes or rings made from dielectric materials. The region inside the former is called the core, which can consist of either a solid material or just air. Small-diameter coils are usually wound directly on to a solid core, which acts as the former. The higher the inductance (L) of a coil, at a given frequency, the greater the sensitivity of eddy current testing. It is desirable that the current through the coil be as low as possible. An excessive current may produce:

a rise in temperature, hence an expansion of the coil, which increases the value of L.

magnetic hysteresis, which is small but detectable when a ferrite core is used.

The simplest type of probe is the single-coil probe, which is in widespread use.

Eddy current testing requires determination of the components of the impedance of the detecting coil or the potential difference across it. Most applications require the determination only of changes in impedance, which can be measured with a high degree of sensitivity using an AC bridge. The principles of operation of the most commonly used eddy current instruments are based on Maxwell's inductance bridge, in which the components of the impedance of the detecting coil, commonly called a probe, are compared with known variable impedances connected in series and forming the balancing arm of the bridge.

The input to the bridge is an AC oscillator, often variable in both frequency and amplitude. The detector arm takes the form of either a meter, a storage cathode-ray oscilloscope or a computer, a phase-sensitive detector, a rectifier to provide a steady indication, and usually an attenuator to confine the output indication within a convenient range. Storage facilities are necessary in the oscilloscope or computer in order to retain the signal from the detector for reference during scanning with the probe.

The highest sensitivity of detection may be achieved by properly matching the impedance of the probe to the impedance of the measuring instrument. Thus, with a bridge circuit which is initially balanced, a subsequent but usually small variation in the impedance of the probe may upset the balance, and a potential difference appears across the detector arm of the bridge. Although the Maxwell inductance bridge forms the basis of most eddy current instruments there are several reasons why it cannot be used in its simplest form, including the creation of stray capacitances, such as those formed by the leads and leakages to earth. These unwanted impedances can be eliminated by earthing devices and the addition of suitable impedances to produce one or more wide-band frequency (i.e. low Q) resonance circuits. Instruments having a wide frequency range, e.g. from 1 kHz to 2 MHz, may possess around five of these bands to cover the range. The value of the impedance of the probe is therefore an important consideration in achieving proper matching and, as a result, it may be necessary to change the probe when switching from one frequency band to another.

Eddy current data can be collected using automated scanning systems to improve the quality of the measurements and to construct images of scanned areas. The most common type of scanning is line scanning where an automated system is used to push the probe at a fixed speed past the material being tested. The data is usually presented as a line scan recording. The advantage of using a linear scanning system is that the probe is moved at a constant speed so indication on the line scan can be correlated to a position on the part being scanned. As with all automated scanning systems, operator variables, such as wobble of the probe, are reduced. Two-dimensional scanning systems are used to scan a two-dimensional area. This could be a scanning system that scans over a relatively flat area in a X-Y raster mode, or it could be a bolt-hole inspection system that rotates the probe as it is moved into the hole. The data is typically displayed as a false-colour plot of signal strength or phase angle shift as a function of position, similar to an ultrasonic C-scan presentation.

Multiple frequency eddy current techniques involve collecting data at several different frequencies and then comparing the data or mixing the data in some way.

The impedance of an eddy current probe may be affected by the following factors:

variations in operating frequency variations in electrical conductivity and the magnetic permeability of an object or structure, caused by structural changes such as grain structure, work hardening, heat treatment, etc.

changes in liftoff or fill factor resulting from probe wobble, uneven surfaces, and eccentricity of tubes caused by faulty manufacture or denting the presence of surface defects such as cracks, and sub-surface defects such as voids and non metallic inclusions dimensional changes, for example, thinning of tube walls due to corrosion, deposition of metal deposits or sludge, and the effects of denting the presence of supports, walls, and brackets the presence of discontinuities such as edges Several of these factors may present simultaneously. In a case where interest is confined to detecting defects or other abrupt changes in geometry, a differential probe can be used to eliminate unwanted factors, providing they vary in a gradual manner. For example, variations in electrical conductivity and tube thinning affect both coils of a differential probe simultaneously. However, if unwanted parameters that occur abruptly are affecting the measurements, they can sometimes be negated by mixing signals collected at several frequencies.

There are a number of commercially available multi-frequency eddy current instruments. Most operate at only two frequencies at a time but some units can collect data at up to four frequencies simultaneously. Multi-frequency measurements can also be made using an impedance analyzer but this equipment is generally not suitable for field measurements. The interest in pulsed eddy current instruments is largely due to their ability to perform multi-frequency measurements quickly and easily.

Finished parts in a manufacturing process may need to be scanned with eddy current probes either manually or in an automated system. For finished parts this is not trivial with automated systems being required where high throughput or traceable quality processes in the production line are needed. These automated systems tend to be custom designed for each application and may be costly to build and commission.

For the inspection of raw materials the same requirements may be needed. Here the systems are normally part of the process line rather that at the end of it and thus inspection speeds, noise and material stability under the sensors is much more difficult to control.

In general in automated systems noise is a major issue and may affect system commissioning in the end-customer's plant as it is difficult to predict or simulate the environment when designing the system. Where multiple sensors are needed to achieve throughput of material the situation becomes more complex due to the effects of self-interference between sensors and the associated signal conditioning systems.

In hand held systems the user needs to scan a component to achieve a suitable output. This is not always feasible in areas where access is limited or the shape of the component does not allow access.

Probe lift-off (uncontrolled distance from the material) is a common problem both in manual and automated systems. There have been a number of attempts to solve this issue but the problem remains.

Multi frequency systems may use time division multiplexing. Frequency division multiplexing is possible but requires more complex analogue and digital signal processing. For example two frequencies will need to be chosen with sufficient spacing to enable system filtering to discriminate and acquire the wanted signals. The co-existence of the two frequencies is possible if there is sufficient spacing between the sensors. Pulsed systems are being evaluated to try and address these issues but they have the same basic issues as described above.

The topology of commercially produced eddy current systems is such that a signal is generated that produces excitation in the material under test and the resulting signal reception is required at a sufficient signal to noise ratio to enable amplitude and phase detection with the accuracy required for parameter (for example defect or material change) detection. Thus the premise is that a clean signal is required to enable detection. Attempts have been made to improve signal output through sensor design and many variants are well documented.

Inventors of the present embodiments have identified that it may be desirable to develop a more precise method of eddy current inspection that would allow operation in a noisy environment; that are multiple frequency; and preferably remove the need to scan the material under test.

Figure 4:
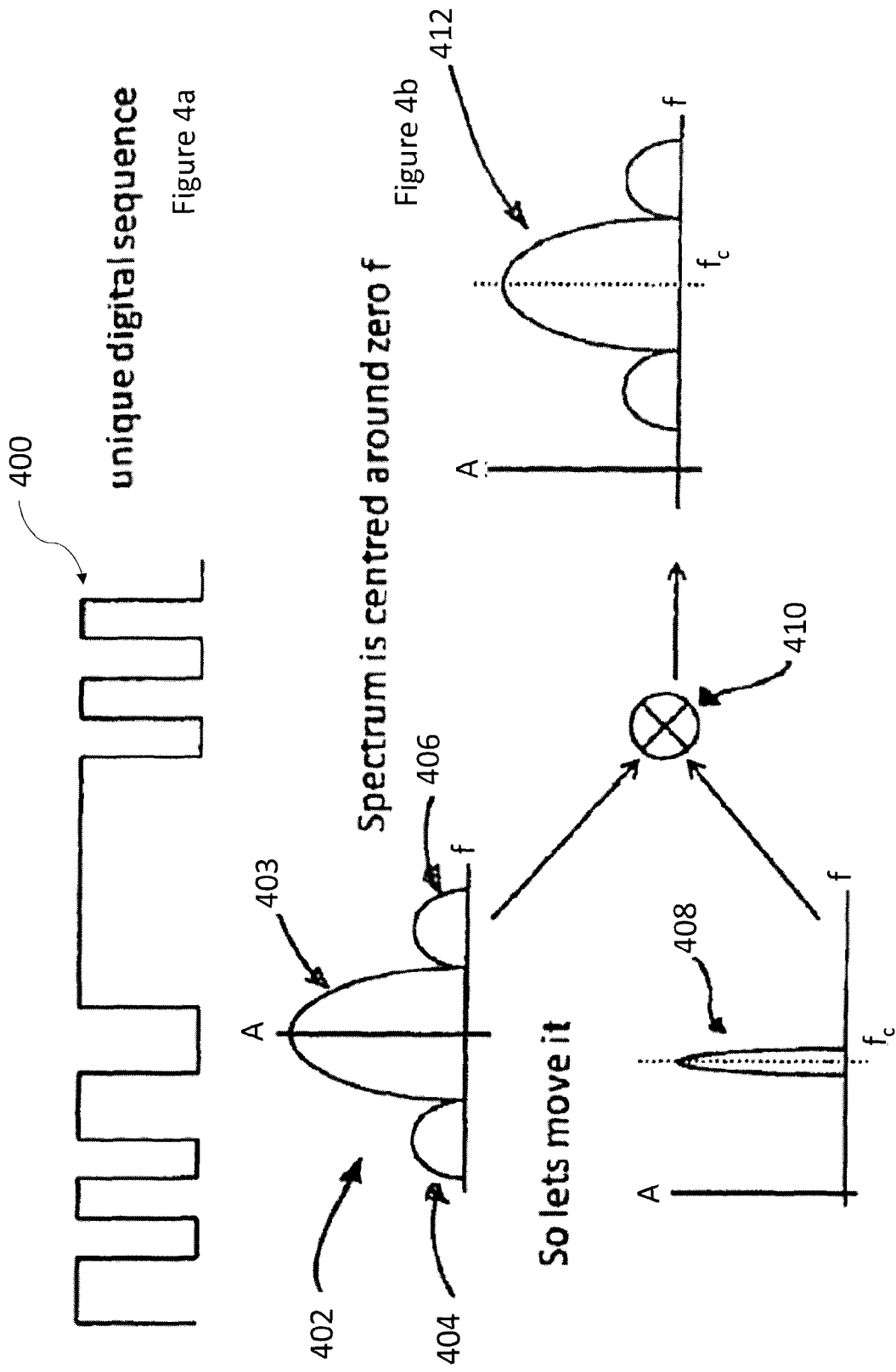
FIG. 4A is a plot of a digital sequence in the time-domain according to an embodiment.
FIG. 4B is a plot of a frequency-domain spectrum associated with the digital sequence of FIG. 4A according to an embodiment.

Spread spectrum is used in some modern communication systems. FIGS. 4A and 4B provide an overview of how a spread spectrum signal can be created from a low cross correlation sequence and its spectrum organised to have a defined centre frequency.

FIG. 4A shows a spread spectrum signal 400 in the time domain, the signal varying between "1s" and "0s". The digital sequence 400 may be unique within a set of digital sequences being detected.

FIG. 4B shows a frequency domain representation of a spectrum 402 associated with the digital sequence of FIG. 4A. A centre-lobe 403 is centred around a frequency of 0 Hz, and the spectrum 402 further comprises side lobes 404 and 406 either side of centre-lobe 403. In order to shift the spectrum away from 0 Hz for use in a system it can be multiplied with a defined centre frequency signal $f_c$ 408 using a multiplier or modulator 410. This results in frequency spectrum 412 wherein the representation 402 has been shifted so as to move the centre of the spectrum away from 0 Hz i.e. to be centred at frequency $f_c$, for improved analysis of the spectrum and thus the material under test.

Figure 5:
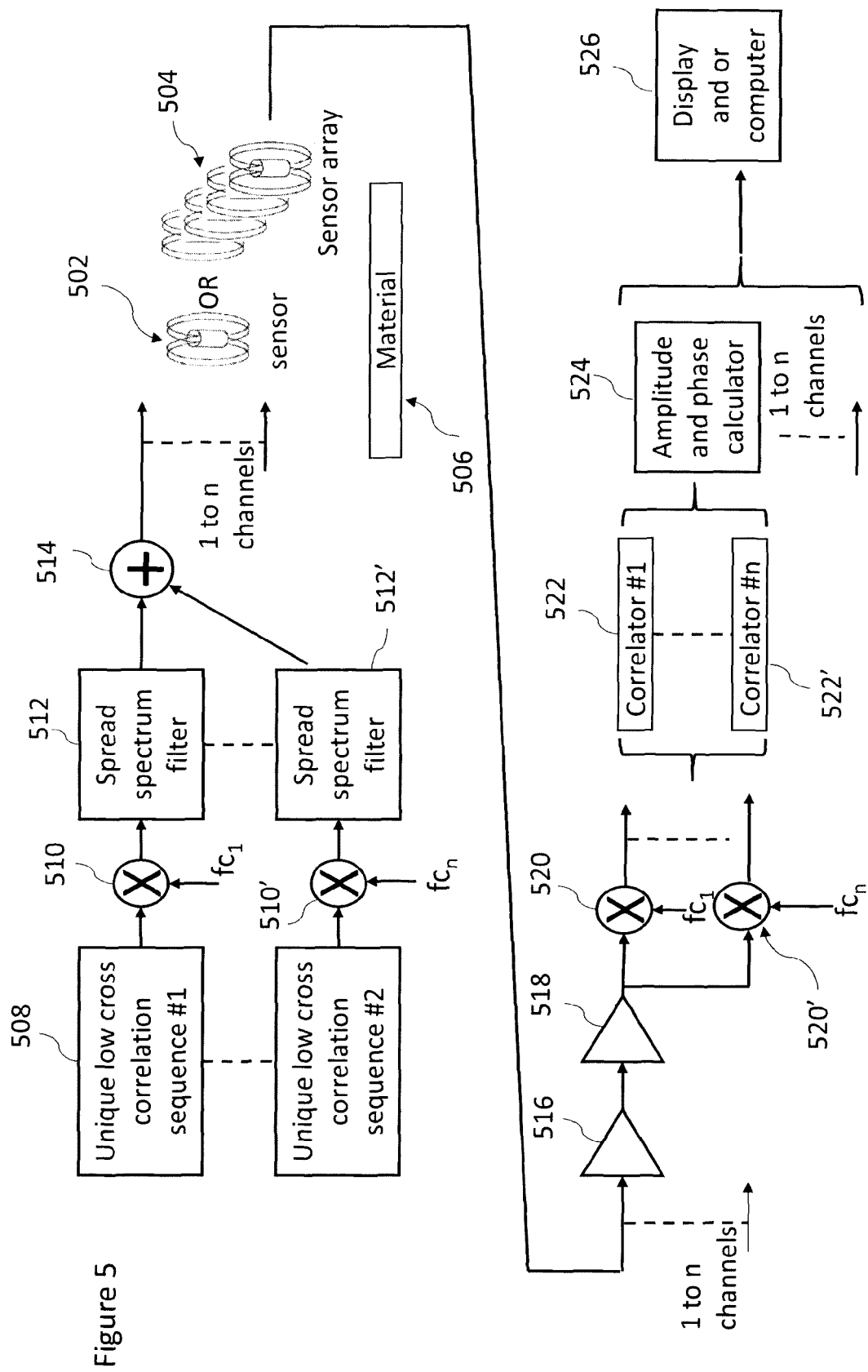
FIG. 5 shows parts of an inspection apparatus according to some embodiments.

One embodiment, which utilises some of the concepts of FIGS. 4A and 4B is shown in FIG. 5.

A sensor 502 or sensor array 504 is used to produce one or more eddy current excitations in a material 506 that is under test. The eddy current excitation or excitations can be produced by applying a current in the sensor 502 or sensor array 504 in the vicinity of material 506. The applied current of the sensor 502 or each sensor in sensor array 504 may comprise a unique digital sequence, such as that shown in FIG. 4A. That is in the multi-sensor array 504 each sensor may apply a signal to material 506 having a unique digital sequence. The single sensor 502, or each sensor in array 504, may also generate successive signals each having a unique digital sequence. In the frequency domain this unique low cross-correlation sequence can be represented as a spread spectrum, as shown at 508. "Low cross-correlation" may refer to a sequence or signal which has a low or zero likelihood of interfering with, or being mistaken for, another sequence or signal. The one or more sequences 508 are then multiplied by a respective centre frequency $f_{c1}$ to $f_{cn}$ using a multiplier or modulator 510 to 510', and then each signal is then passed through a respective spread spectrum filter 512 to 512'. After filtering, the signals are added to each other using an "adder" or summing amplifier 514. Following this signal processing in the sensor 502 or sensor array 504 the signal or signals are applied to the material 506 on channels 1 to n (where "n" may equal the number of sensors in the sensor array 504).

The applied signal or signals cause respective eddy current excitation(s) in the material 506. These one or more eddy current excitations are then sensed by the sensor 502 or sensors within sensor array 504 on channels 1 to n, and the received signals are passed through amplifier 516, prior to conversion at analogue to digital converter 518. In some embodiments the sensor array 504 can determine correspondence between the applied signals and the signals received back at the sensor array i.e. it can match an applied signal to its corresponding eddy current excitation, and accordingly to a corresponding received signal.

Following the amplification of the received signals, each received signal is multiplied by a respective centre frequency $f_{c1}$ to $f_{cn}$ using respective demodulators or multipliers 520 to 520'.

The signals from the demodulator 520 to 520' for each of channels 1 to n then undergo correlation at correlators 522 to 522'. The correlation may comprise matching a received signal associated with one or more eddy current excitations to a transmitted signal from the one or more sensors. This is possible because of the unique identity of the low cross-correlation sequence(s) transmitted by the sensor or each of the sensors. In some embodiments a sensor may detect a received signal associated with an excitation caused by transmission of a signal from the same sensor. In embodiments each sensor may also be capable of detecting excitations caused by other sensors.

Following this the amplitude and phase of each received signal or excitation on channels 1 to n is then calculated from the correlation output using amplitude and phase calculator 524. The calculation or determination made at calculator 524 for the one or more channels can then be used to determine properties, or make an assessment of, the material 506 under test. The results of this assessment or determination can be displayed to the user on a display and/or on a computer 526.

Thus, in other words, signals can be created at one or more frequencies simultaneously, using coding (FIG. 5, 508) that has the property of low or zero cross correlation. The latter property enables a receiving sensor to receive multiple signals from one or many sensors in an array simultaneously and in the presence of noise and for a detector to determine each signal and the parameters of said signal such as amplitude and phase. Each unique code is modulated (FIG. 5, 510) to create a spread spectrum at a nominal centre frequency $fc_x$. This is then post-filtered to minimise energy outside the spread spectrum (FIG. 5, 512 to 512'). Multiple frequencies can be covered by using further unique codes and summing (FIG. 5, 514). The receiver may be the same sensor or a separate sensor, or an array (FIG. 5, 502 and 504). The output requires signal conditioning (FIG. 5, 516) prior to analogue to digital conversion (FIG. 5, 518). The acquired signal contains one or many unique codes spread across the frequency spectrum, each code may be demodulated (FIG. 5, 520 to 520') prior to correlation (FIG. 5, 522 to 522') which results in an output of amplitude and phase (FIG. 5, 524). One or many channels can be arranged in this manner for input to a computer system (FIG. 5, 526) for processing. The computer system output may be the calculated impedance of each sensor with distance or an array of data points for further visualisation.

Figure 6:
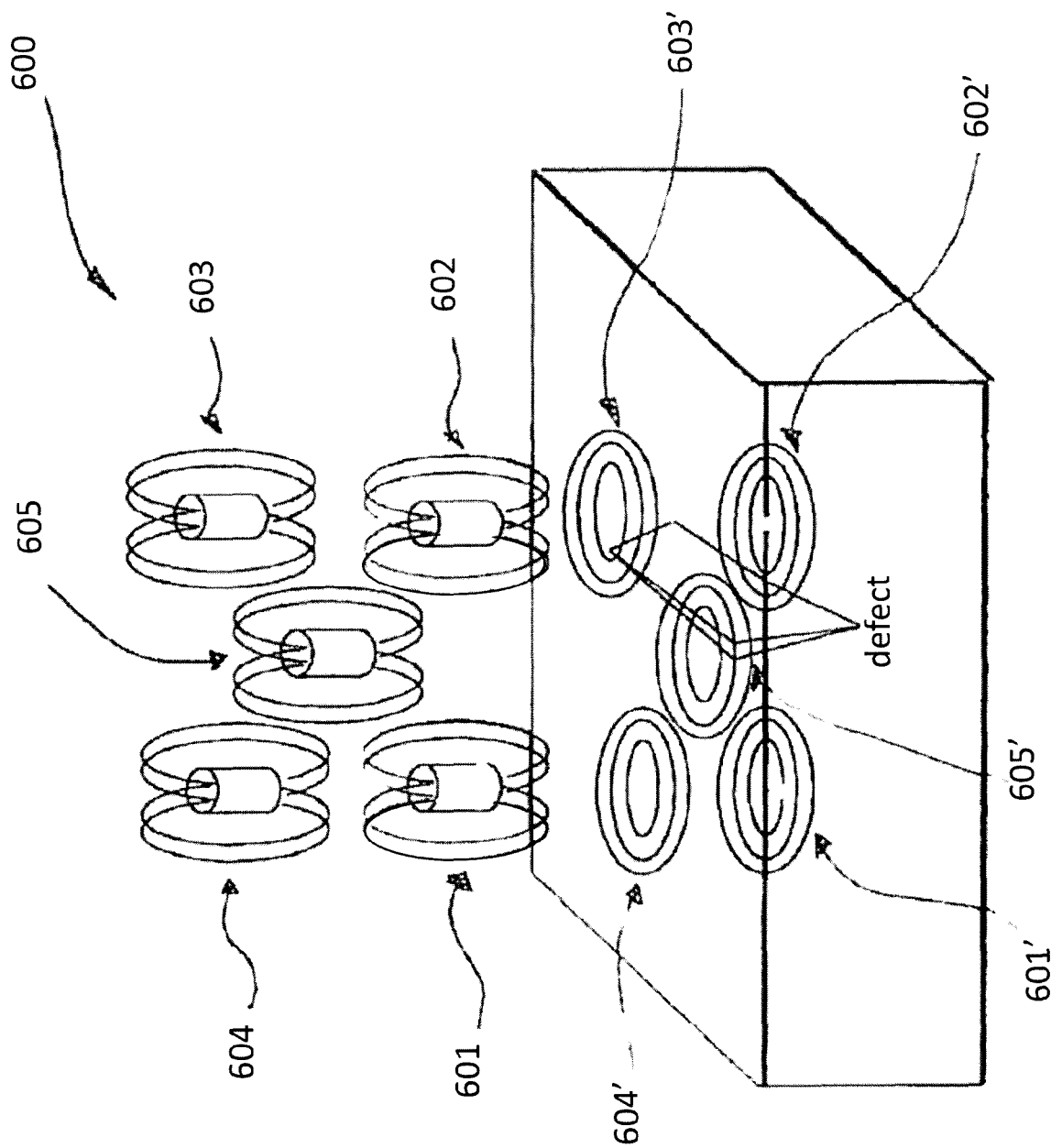
FIG. 6 shows parts of an inspection apparatus according to another embodiment.

As an example for assessing finished parts in a manufacturing process the arrangement may remove the need for physical scanning (i.e. movement of the probe or sensor relative to the test material) by using an array as shown in FIG. 6. In FIG. 6 each sensor 601, 602, 603, 604, 605 of array 600 has its own simultaneous or respective excitation 601', 602', 603', 604' and 605' providing a measurement area in the material. A defect can be seen if it crosses the flux lines of one or more excitation, thus causing a disturbance which can be sensed by one or more of the sensors. To cover the areas between sensors and in the places where a defect may not cross the flux lines the sensors may also be excited in multiples, for example as pairs using the same code but with opposing polarity.

The use of multiple low cross-correlation codes on each sensor may enable each sensor's received signal to have its excitation received in addition to the effect of the received signals from other sensors around it without degradation or cross coupling effects.

Figure 7:
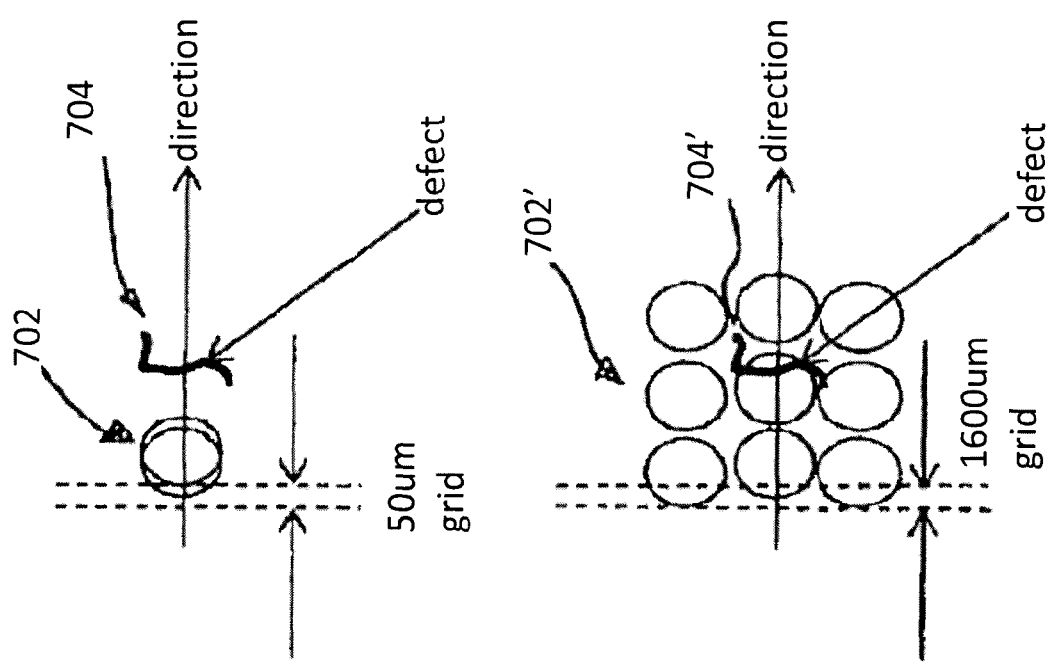
FIG. 7 shows a comparison of single-sensor and multi-sensor inspection according to an embodiment.

FIG. 7 shows a comparison of a single probe/sensor and a multi probe/sensor array using the described excitation method. The upper diagram in FIG. 7 shows a single sensor for sensing a defect 704. The lower diagram in FIG. 7 shows a sensor array 702' consisting of nine sensors for detecting the defect 704. When components are scanned or sampled in a manner as shown for example in FIG. 7, where a material in the example is passing a sensor at 300 m/min there is a trade off between sampling grid (surface distance) and depth of penetration. At 100 KHz operating frequency the surface grid maximum is 50 um (as this is one cycle of 100 KHz). It will be appreciated that these values are by way of example only and may vary. The surface grid does not define the minimum detectable defect size however as this is determined by the sensor diameter and the sensitivity of the system.

Figure 8:
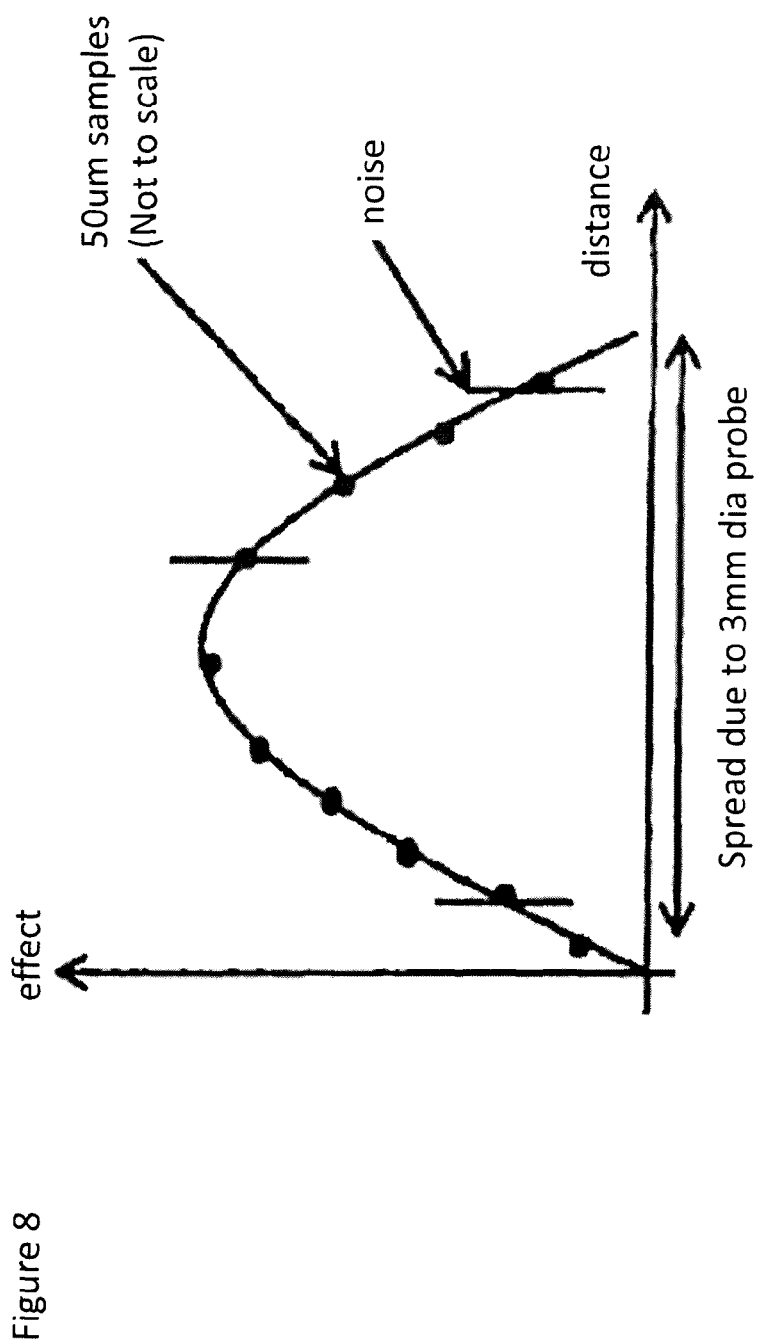
FIG. 8 is a plot of excitation samples corresponding to the single-sensor inspection system of FIG. 7.

FIG. 8 shows the response to a defect in a typical scanning system where the measurement samples may also contain noise. FIG. 8 corresponds to a scanning or sampling result obtained using the single sensor system shown in the top diagram of FIG. 7. Each point on the curve represents a measurement taken every 50 um. The points at the extremities of the curve are where the probe is first reaching or is just leaving the defect, and therefore the effect on the probe is small. The point at the top of the curve is where the probe is centred over the defect i.e. the point at which the effect on the probe is at its greatest. The shape of the curve is determined by the probe diameter and the defect size This may increase the uncertainty in defect detection. Noise is present about some of the samples, as shown by the error bars. If the noise is too great, the sample measurement may be unusable. One possible strategy for mitigation is to average the samples.

Figure 9:
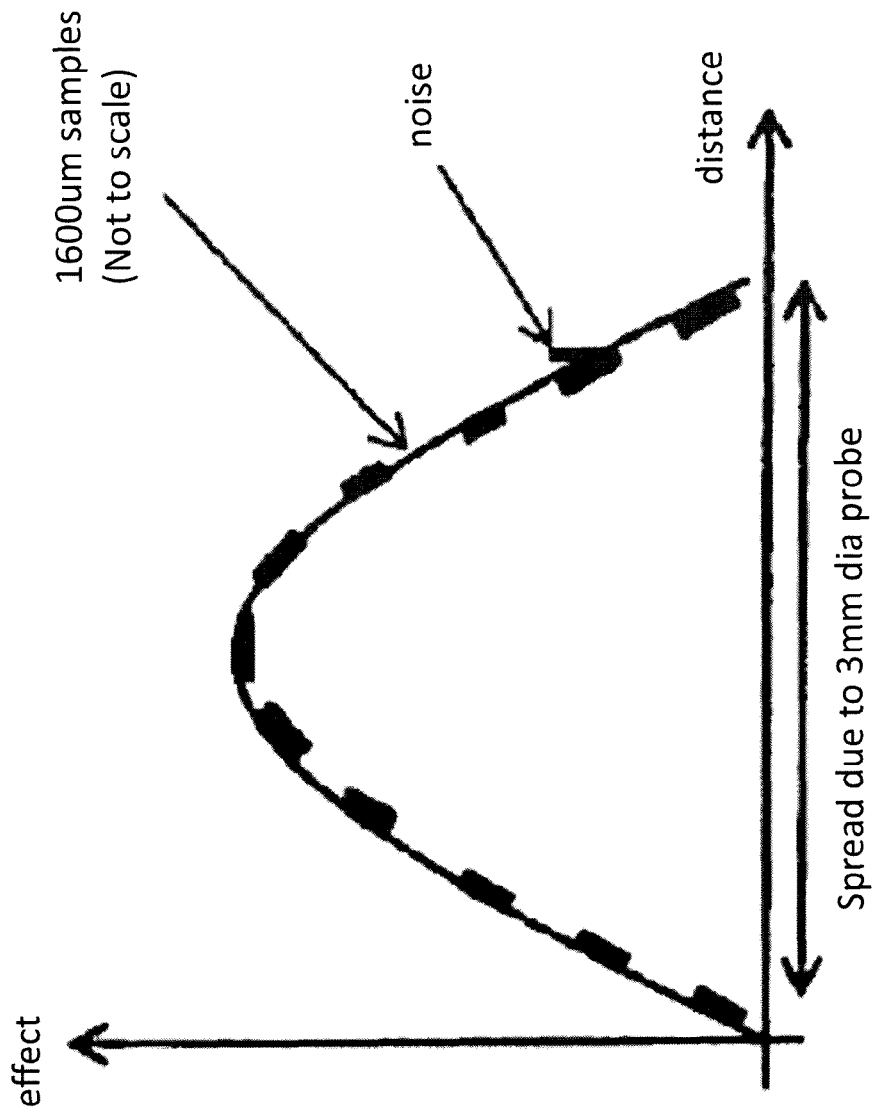
FIG. 9 is a plot of excitation samples corresponding to the multi-sensor inspection system of FIG. 7

The plot of FIG. 9 corresponds to a scanning or sampling result using a multi-sensor array, as per the lower diagram of FIG. 7. Using an array where each element is excited with a sequence that is unique and has low cross-correlation, as in FIG. 9, may significantly reduce the effects of noise, material permeability and probe lift-off. Each measurement may also be taken over a greater distance of the defect, compared with FIG. 8.

Exciting simultaneously the array elements digitally so that each element receives a stream that contains the excitation and spread spectrum may enable multiple frequency operation.

The excitation stream for each probe/sensor in this case may contain a unique sequence for each frequency band plus ones that are the opposing phase of, for example, an adjacent sensor that enables a pair of elements to act as one thus increasing the inspection area and depth resolution.

In a case where a single frequency measurement is obtained using a differential probe, then this may only provide an operator with an indication that there may be a defect. If the defect extents are larger than the probe then it requires operator skill to ascertain that it is one large defect and not two small ones. If the defect depth is greater than the eddy current penetration depth then there is no information to enable the actual depth to be ascertained. Some embodiments may address these issues.

Figure 10:
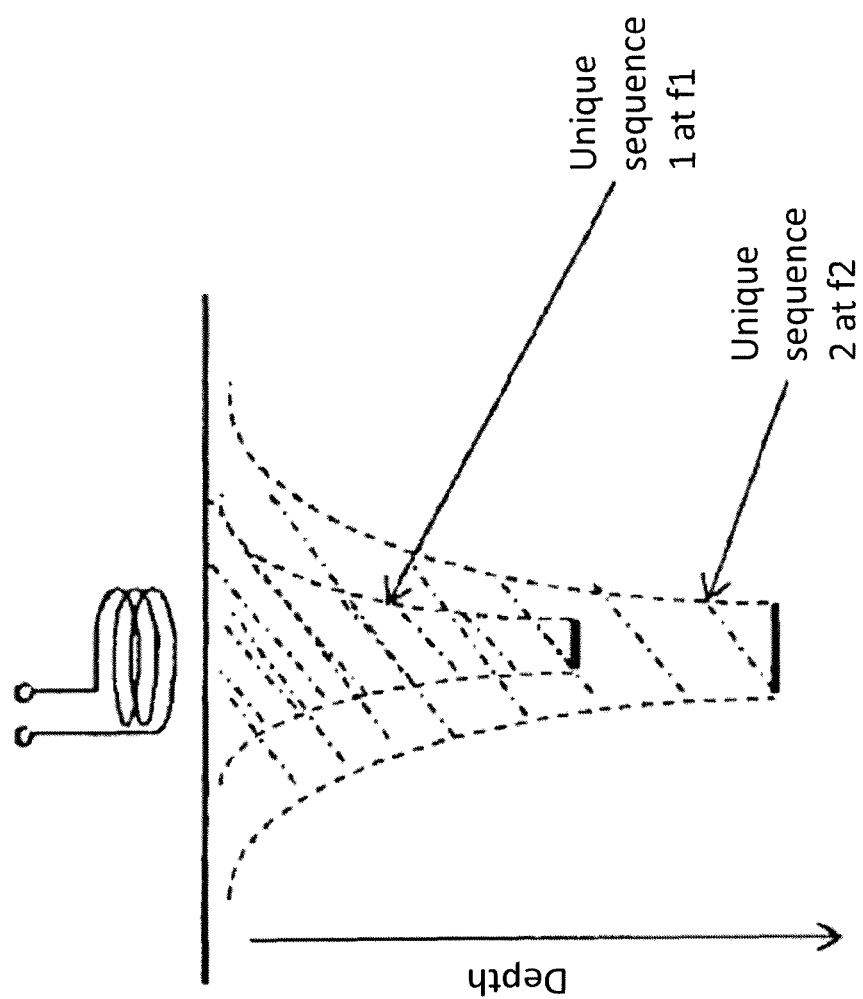
FIG. 10 shows operation of a single sensor for inspecting differing depths of material according to an embodiment.

As shown in FIG. 10, illuminating a material using eddy currents to detect, for example, a defect from a number of directions and at different frequencies may enable the resulting received signals to be used to provide insight into the material integrity that may not be possible from a simple single frequency/position impedance measurement. Indeed the ability to change the excitation in real time enables the measurement parameters to be changed or optimised depending on the resulting received signals.

It can also be appreciated from FIG. 10 that applying signals using different frequencies enables inspection at differing depths of the material under test.

It will be appreciated that the embodiments described can be combined in any way. For example a multi-sensor array may also use the multi-frequency technique shown in FIG. 10. Using a multi-sensor array and different signal frequencies may enable a 3-dimensional or volumetric picture of a defect to be obtained. That is in some embodiments a user is not just made aware of the presence of a defect, but may also be able to determine properties (such as size and shape) of the defect.

In some embodiments the sensor comprises a combined transmitter and receiver. In other embodiments the transmitter and receiver may be physically separated.

The skilled person will appreciate that any of the methods described herein may be implemented using a computer program embodied on a computer readable medium (such as a CDROM or memory within an electronic device) for controlling a controller (or other similar apparatus as discussed above).

The foregoing merely illustrates the principles of certain embodiments. Modifications and alterations to the described embodiments will be apparent to those skilled in the art in view of the teaching herein. It will thus be appreciated that those skilled in the art would be able to devise numerous techniques which although not explicitly described herein, embody the principles of the described embodiments and are thus within the scope defined by the claims.

The invention claimed is:

1. A method of inspecting a material comprising:
producing at least one eddy current excitation in a material under test using a low cross-correlation coded spread spectrum;
sensing said at least one eddy current excitation in the material under test;
using a correlation technique to make a determination of amplitude and phase of the sensed at least one eddy current excitation; and
using the determination to make an assessment of the material under test,
wherein multiple eddy current excitations are produced and sensed, each excitation being distinguished due to respective unique codes of the excitations.

2. The method of claim 1, wherein sensing said at least one eddy current excitation includes using an array of sensors.

3. The method of claim 1, wherein using the determination to make an assessment of the material under test includes using the determination to determine the presence of one or more defects in the material under test.

4. The method of claim 1, wherein using the determination to make an assessment of the material under test includes using the determination to determine at least one of: a material type of the material under test or whether the material has undergone local burning or heat treatment.

5. The method of claim 1, wherein using the determination to make an assessment of the material under test includes using the determination to determine the presence of one or more defects in the material under test,
wherein a detected defect can be longer than one probe diameter of a probe used for said sensing.

6. The method of claim 1, further comprising detecting and compensating for at least one of: lift off or temperature variation.

7. The method of claim 1, further comprising detecting gradual changes in properties of the material under test.

8. The method of claim 2, further comprising maintaining said array of sensors in a static position relative to said material under test during said sensing.

9. The method of claim 1, further comprising altering parameters of the low cross correlation coded spread spectrum based on the determination.

10. The method of claim 1, further comprising using the sensed at least one eddy current excitation to perform at least one of: make an assessment of a structural integrity of the material under test or produce a volumetric visualisation of the material under test.

11. The method of claim 1, further comprising using the determination to provide feedback to a manufacturing process producing the material under test.

12. A computer program comprising computer executable instructions which when run on one or more processors performs the method of claim 1.

13. An apparatus comprising:
a sensor configured to produce at least one eddy current excitation in a material under test,
wherein the sensor is configured to sense said at least one eddy current excitation in the material under test, and
wherein the sensor is configured to use a low cross correlation coded spread spectrum to produce said at least one eddy current excitation; and
an amplitude and phase calculator configured to make a determination of amplitude and phase of the sensed at least one eddy current excitation using a correlation technique,
wherein the the amplitude and phase calculator is configured to use the determination to make an assessment of the material under test,
wherein the sensor is configured to produce multiple eddy current excitations and to sense multiple eddy current excitations each excitation being distinguished due to respective unique codes of the excitations.

14. The apparatus of claim 13, wherein said sensor comprises an array of sensors.

15. The apparatus of claim 13, wherein the amplitude and phase calculator is configured to use the determination to determine at least one of: the presence of one or more defects in the material under test, a material type of the material under test, or whether the material under test has undergone local burning or heat treatment.

16. The apparatus of claim 14, wherein said array of sensors are configured to be held in a static position relative to said material under test during sensing of said at least one eddy current excitation.

17. The method of claim 2, wherein the sensors are excited as pairs using the same code but with opposing polarity.

18. The method of claim 3, further comprising using eddy currents to detect the one or more defects from a number of directions and at different frequencies.

19. The apparatus of claim 14, wherein the sensors are excited as pairs using the same code but with opposing polarity.

20. The apparatus of claim 15, wherein the the amplitude and phase calculator is configured to use the determination to determine the presence of one or more defects in the material under test, and wherein the sensor is configured to use eddy currents to detect the one or more defects from a number of directions and at different frequencies.

* * * * *